US011552688B2

(12) United States Patent
Rose et al.

(10) Patent No.: US 11,552,688 B2
(45) Date of Patent: Jan. 10, 2023

(54) CHANNEL STATE INFORMATION REPORTING

(71) Applicant: NOKIA TECHNOLOGIES OY, Espoo (FI)

(72) Inventors: Luca Rose, Orsay (FR); Muhammad Karam Shehzad, Chakwal (PK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/506,149

(22) Filed: Oct. 20, 2021

(65) Prior Publication Data
US 2022/0123807 A1   Apr. 21, 2022

(30) Foreign Application Priority Data

Oct. 20, 2020   (FI) ..................................... 20206036

(51) Int. Cl.
H04B 7/06 (2006.01)
H04W 8/24 (2009.01)
H04B 17/373 (2015.01)

(52) U.S. Cl.
CPC ......... *H04B 7/0626* (2013.01); *H04B 17/373* (2015.01); *H04W 8/24* (2013.01)

(58) Field of Classification Search
CPC ..... H04B 7/0626; H04B 17/373; H04W 8/24; H04W 8/02
See application file for complete search history.

(56) References Cited

U.S. PATENT DOCUMENTS

| 2020/0052757 | A1  | 2/2020  | Wang et al. |
| 2020/0259545 | A1* | 8/2020  | Bai ........................ H04W 72/14 |
| 2021/0211912 | A1* | 7/2021  | Zeng ...................... H04L 5/0057 |
| 2021/0376895 | A1* | 12/2021 | Xue ........................ H04L 1/1854 |

FOREIGN PATENT DOCUMENTS

| CN | 111165010 A | 5/2020 |
| WO | WO 2019/138156 A1 | 7/2019 |
| WO | WO 2020/025109 A1 | 2/2020 |
| WO | WO 2020/163096 A1 | 8/2020 |

OTHER PUBLICATIONS

Communication of Acceptance under section 29a of Patents Decree dated Sep. 14, 2021 corresponding to Finnish Patent Application No. 20206036.
Office Action dated Mar. 2, 2021 corresponding to Finnish Patent Application No. 20206036.
(Continued)

*Primary Examiner* — Derrick V Rose
(74) *Attorney, Agent, or Firm* — Squire Patton Boggs (US) LLP

(57) ABSTRACT

Apparatuses and methods in a communication system are disclosed. Reference data is transmitted to terminal device. Information describing state of the channel between the apparatus and the terminal device is received, for a given time period, from the terminal device. A predicted state of the channel is calculated utilising a given channel predictor function known by the terminal device. Update information to the predicted state of the channel is received from the terminal device.

10 Claims, 6 Drawing Sheets

(56) References Cited

OTHER PUBLICATIONS

Finnish Search Report dated Mar. 2, 2021 corresponding to Finnish Patent Application No. 20206036.
Samsung, "New WID: Further enhancements on MIMO for NR," RP-193133, 3GPP TSG RAN Meeting #86, Sitges, Spain, Dec. 12, 2019.
Extended European Search Report dated Mar. 22, 2022 corresponding to European patent Application No. 21203388.0.
Chinese Office Action corresponding to CN Application No. 202111221847.9, dated Jul. 19, 2022.

* cited by examiner

CHANNEL STATE INFORMATION REPORTING

FIELD

The exemplary and non-limiting embodiments of the invention relate generally to wireless communication systems. Embodiments of the invention relate especially to apparatuses and methods in wireless communication networks.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

Channel state information (CSI) measured by terminal devices and reported to network is used in communication systems to help to control downlink transmissions. To meet the requirements of users, many transmission schemes such as coding, adaptive modulation and channel-aware scheduling, for example, need accurate CSI at the transmitter side to achieve a significant gain in the downlink direction. Thus, obtaining accurate CSI is important.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1 and 7.

According to an aspect of the present invention, there are provided methods of claims 11 and 12.

According to an aspect of the present invention, there are provided computer programs comprising instructions of claims 14 and 15.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

Figure 1:
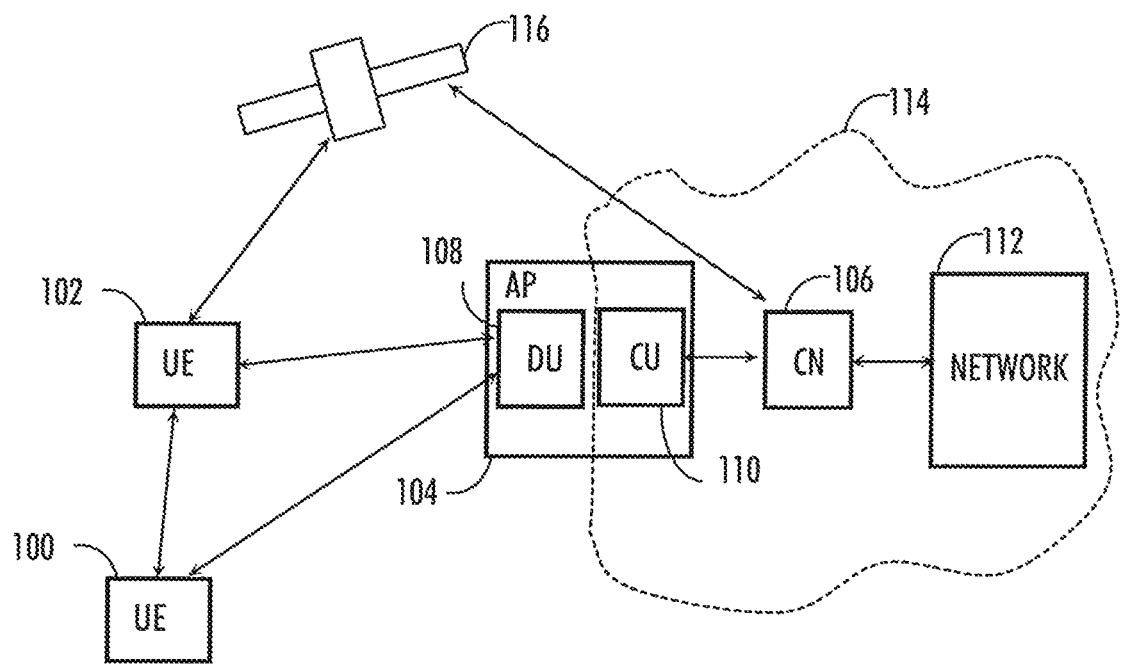

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node, such as (e/g)NodeB, serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC).

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G or NR (New Radio) enables using multiple input-multiple output (MIMO) antennas, many more base stations or nodes than the Long Term Evolution, LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication 116 to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
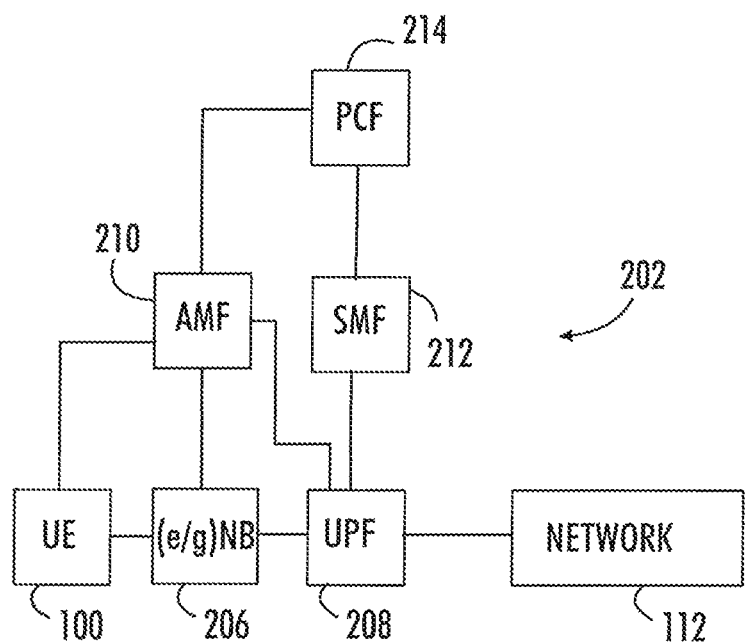

FIG. 2 illustrates an example of a communication system based on 5G network components. A user terminal or user equipment 100 communicating via a 5G network 202 with a data network 112. The user terminal 100 is connected to a Radio Access Network RAN node, such as (e/g)NodeB 206 which provides the user terminal a connection to the network 112 via one or more User Plane Functions 208. The user terminal 100 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function 214 which is configured to govern network behavior by providing policy rules to control plane functions.

As mentioned, channel state information (CSI) is used in modern wireless communication systems. CSI acquisition is important for example for multiple-input multiple-output (MIMO) precoding. Currently in fifth generation (5G) systems, two different methods are considered for CSI report: type I CSI and type II CSI feedback.

In CSI, the channel between the network node and terminal device is estimated starting from pilots transmitted by the network node such as a (e/g)NodeB. The pilot signals or symbols may periodic, semi-persistent or aperiodic. In 5G, both methods include a strong compression of the CSI estimated at the terminal device side in order to reduce the over-the-air (OTA) overhead. The compression used at the CSI feedback from a terminal device to the network node impact the precision of the CSI and consequently the performance of the precoding.

It has been noted that CSI possesses a certain level of time-consistency. Thus, CSI at a given time instant n is somehow correlated with the CSI at a given time instant n−1, n−2 . . . . This is particularly true for non-mobile terminal devices and for terminal devices whose mobility pattern can be predicted. Examples of the latter include a device on a train or traveling on a freeway.

Figure 3:
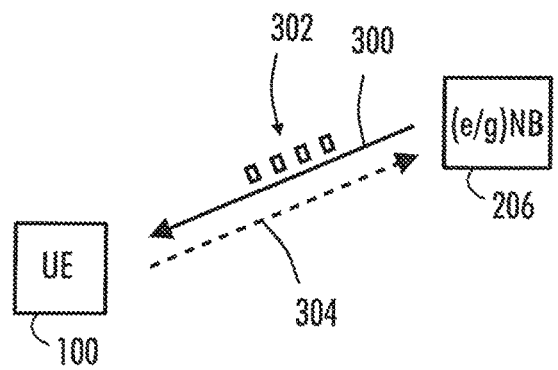
FIG. 3 illustrates an example scenario.

FIG. 3 illustrates an example scenario, where (e/g)NodeB 206 is transmitting a signal 300 comprising pilot symbols or reference signal 302 to the terminal device 100. The terminal device is configured to determine CSI of the received signal and transmit the determined CSI 304 in a compressed form to the (e/g)NodeB prior to data scheduling. What is the form of the reference signal or the pilot symbols and how CSI is determined, is not relevant regarding the embodiments of the invention.

For each terminal device in the cell, the (e/g)NodeB may be configured to store a given amount of previous CSI estimations. In an embodiment, this data, which available at both ends, may be used both by the (e/g)NodeB and terminal device to predict future CSI values. A channel predictor (CP) function may be applied at both the (e/g)NodeB and terminal device. The predictor function will receive same inputs at both sides and predict the next channel states. In an embodiment, the output of the predictor function may be used at the (e/g)NodeB for controlling data transmission to the terminal device. The terminal device may transmit an updated channel information as a feedback with respect to the prediction. In an embodiment, the feedback may take fewer OTA resources than signalling the whole CSI. In an embodiment, the feedback may be sent with less severe compression than signalling the whole CSI and thus improve CSI performance.

For simplicity, we will describe the invention for a single (e/g)NodeB terminal device link, while keeping in mind that the proposed solution may be repeated for all the terminal devices supporting the proposed predicting procedure.

In following, $S_n^{BS} = \{\hat{H}_k^{BS}\}_{k=n-N}^{n-1}$ denotes the set N past of estimated CSI available at the (e/g)NodeB (BS), and $S_n^{UE}$ denotes the set of estimated channel CSI available at the terminal device (UE), where n is the time instant. k is an index. The predicted channels at instant n at the (e/g)NodeB and the terminal device are indicated by $\tilde{H}_n^{BS}$ and $\tilde{H}_n^{UE}$ respectively, while the actual channel realization is indicated by $H_n$. The feedback from the terminal device to the (e/g)NodeB is denoted by $Feed_n$.

Figure 4:
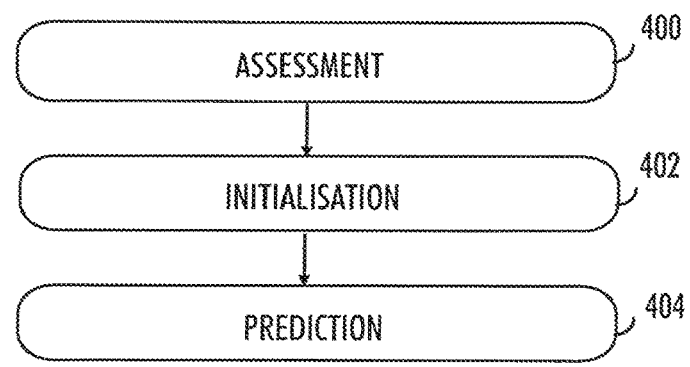
FIG. 4 is a flowchart illustrating some embodiments.

The flowchart of FIG. 4 illustrates an embodiment. The flowchart illustrates an example of an embodiment applied at the (e/g)NodeB and terminal device. In an embodiment, the procedure may be divided into three phases, assessment 400, initialisation 402 and prediction 404.

In assessment phase 400, the (e/g)NodeB and the terminal device may exchange messages in order to assess the capabilities of the terminal device agree on the channel predictor function to be used, establish the amount of past CSI estimation and the length of the initialization phase. The capabilities of the terminal device may comprise the processing capability of the terminal and available memory (for storing CSI values), for example.

Figure 5:
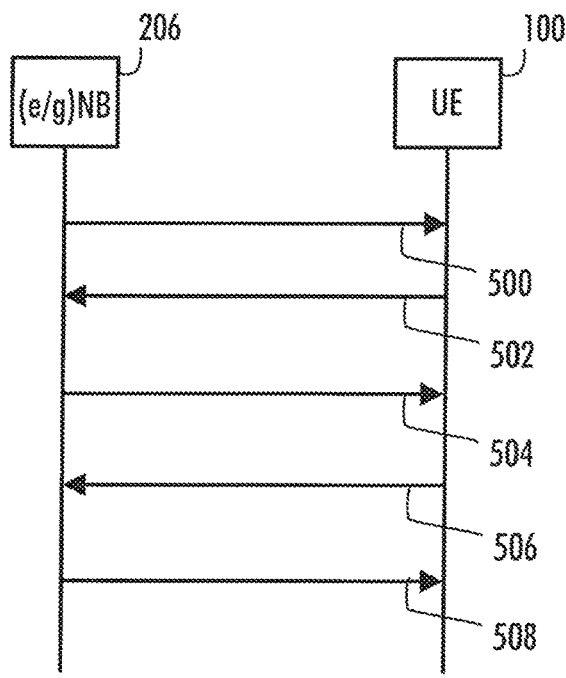
FIG. 5 is a signalling chart illustrating an embodiment.

FIG. 5 illustrates an example of signalling between the (e/g)NodeB 206 and the terminal device 100 in the assessment phase 400.

The (e/g)NodeB transmits a message 500 to the terminal device regarding capabilities of the terminal device. In an embodiment, the message queries machine learning/artificial intelligence capabilities of the terminal device and what kind of channel predictor function is supported by the terminal device to forecast the channel condition.

The terminal device responds with message 502. In case the terminal device supports some channel predictor functions, the terminal device may transmits to the (e/g)NodeB. a list of available channel predictor functions. For example, assuming that the terminal device is capable of using a Kalman filter (KF)-based channel predictor. Therefore, the terminal device will send a response message 502 to the (e/g) NodeB saying that it is capable of using the KF-based channel predictor.

In an embodiment, both the entities may agree (using the 500 and 502 message exchange) on the length of past data, which will be used for making the prediction. Thereby, this past estimated data will be used by the predictors at both ends to predict the next channel realization.

The (e/g)NodeB queries 504 the terminal device about the capability to execute prediction algorithms and CSI memory available in the terminal device. The terminal device is configured to respond 506 with the requester information.

The (e/g)NodeB is configured to, at least partly based on responses from the terminal device, determine the channel predictor function or algorithm to be used and the length of the initialisation phase, where CSI measurements are collected and transmit 508 information on the determination to the terminal device. In an embodiment, the length of the initialisation phase may depend on the chosen channel predictor function or algorithm.

Returning to FIG. 4, initialisation phase 402, follows the assessment phase. In the initialisation phase 402 the (e/g)NodeB and the terminal device gather CSI data need for the channel predictor function or algorithm to operate reliably.

In an embodiment, in the initialisation phase the acquisition of CSI data (e/g)NodeB and terminal device operate according to known methods. The (e/g)NodeB may be configured to transmit pilot symbols or reference symbols to the terminal device which may determine CSI based on the received pilot symbols or reference symbols. The length of the initialisation phase is determined by the (e/g)NodeB. The terminal device may transmit information on the CSI to the (e/g)NodeB in a compressed form.

The terminal device obtains channel estimates $\tilde{H}_n^{UE}$ and transmits information on the estimates to the (e/g)NodeB:

$$\hat{H}_n^{BS} = F_C(\hat{H}_n^{UE})$$

where $F_C(\cdot)$ is a function that includes quantization and reduces the overhead of the feedback information. For example, $F_C(\cdot)$ can be a standard element-wise quantization scheme or the Type-I and Type-II CSI report used in 3gpp.

During this phase, the set of estimated CSI available at the (e/g)NodeB $S_n^{BS} = \{\hat{H}_k^{BS}\}_{n-N-1}^{n-1} = \{F_C(\hat{H}_k^{UE})\}_{n-N-1}^{n-1}$, and it equals the set of estimated CSI available at the terminal device: $S_n^{UE} = S_n^{BS}$.

When the initiation phase 402 has been performed and thus the CSI data gathered both at the (e/g)NodeB and terminal device, the prediction phase 404 starts.

In an embodiment, during this phase, the same channel predictor (CP) function or algorithm may be applied at the (e/g)NodeB and the terminal device to predict the channel based on the same set of past channels as indicated in the gathered CSI data. As equations:

$$\tilde{H}_n^{UE} = \Pr(S_n^{UE})$$

$$\tilde{H}_n^{BS} = \Pr(S_n^{BS})$$

where $\tilde{H}$UE is the predicted channels at instant n at the terminal device, $\tilde{H}_n^{BS}$ the predicted channels at instant n at the (e/g)NodeB and Pr ($\cdot$) is the channel predictor function. It may be noted that since the channel predictor is common to terminal device and the (e/g)NodeB, and $S_n^{UE} = S_n^{BS}$ it will result that $\tilde{H}_n^{BS} = \tilde{H}_n^{UE}$.

It may be that there is a certain difference between the predicted channel and the estimated channel. In an embodiment, the terminal device may be configured to determine an update as:

$$U_n = F_U(\hat{H}_n^{UE}, \tilde{H}_n^{UE})$$

where the function $F_U(\cdot)$ (named the update function) is a measure of the distance between the two matrices. In an embodiment, as a simple implementation, the update function is a difference, and thus $U_n = \tilde{H}_n^{UE} - \hat{H}_n^{UE}$.

Once an update is computed, it may be quantized through a quantization function $F_Q(\cdot)$ and transmitted back to the (e/g)NodeB as $$\text{Feed}_n = F_Q(U_n)$$

In an embodiment, $F_Q(\cdot)$ may be the same as $F_C(\cdot)$.

The update indicates to the (e/g)NodeB the variation between the predicted channel and the actually measured (estimated) channel. In an embodiment, the (e/g)NodeB is configure estimate the channel as:

$$\hat{H}_n^{BS} = \tilde{H}_n^{BS} + F_U^{-1}(\text{Feed}_n)$$

where $F_U^{-1}$ represents an appropriate inverse of the function $F_U$. If the update function is a simple difference, the inverse will be $F_U^{-1} = -F_U$ and $$\hat{H}_n^{BS} = \tilde{H}_n^{BS} - F_Q(\tilde{H}_n^{UE} - \hat{H}_n^{UE}).$$

During this phase the set of estimated CSI available at the (e/g)NodeB $$S_n^{BS} = \{\hat{H}_k^{BS}\}_{n-N-1}^{n-1},$$

and the set of estimated CSI available at the terminal device $$S_n^{UE} = \{\hat{H}_k^{UE}\}_{n-N-1}^{n-1} = \{\tilde{H}_n^{UE} + F_U^{-1}(\text{Feed})\}_{n-N-1}^{n-1}$$

and the equivalence $S_n^{BS} = S_n^{UE}$ still holds.

In the method described above it is possible either to reduce the amount of bit necessary for the feedback for similar performance (i.e. utilising less bits for Feed than would be used for $F_C(\hat{H}_k^{UE})$), or to increase the CSI performance with the same amount of bits.

In an embodiment, if the prediction at the terminal device succeeded and the prediction output equals the estimated channel ($\tilde{H}_n^{UE} = \hat{H}_n^{UE}$), then no feedback would be necessary, bringing the amount of necessary bit to 0.

In an embodiment, different channel predictor functions or algorithms can be tabled and stored. Possible storing elements include function or algorithm, memory, message exchanges.

In an embodiment, the same channel predictor function, is assumed at both ends, i.e., at (e/g)NodeB and terminal device. There are various ways to realise the channel predictor function or algorithm. One example is to apply Artificial Intelligence (AI) based solutions.

A channel predictor function realised utilising Artificial Intelligence or Deep Neural Networks (DNN) is capable of forecasting multi-step channel realizations. Therefore, bringing benefit of further reducing the over-the-air (OTA) overhead or maybe eliminating the feedback. Also, an AI-based channel predictor can be capable of minimizing the channel mean-squared error (MSE), i.e., reducing the error between the predicted and estimated channel.

One of the design challenges of such an AI predictor function is the availability of past data. The more amount of past data is present, the more efficient will be the channel predictor function. Nevertheless, availability of past data is not everything and there comes an element of time consumption when designing a new channel predictor. To cater the problem of having less past information and less time required to make the new prediction, one of the promising solutions, which is also been provided by the AI, is to use transfer learning. In transfer learning, the idea is to design an excellent channel predictor, offline, in a specific environment. Then, apply the weights of trained predictor in a new channel predictor function, which is operating online. For example, in the present solution the task of the channel predictor function is to predict the next channel realization online. Therefore, transfer learning is one suitable method which can be utilised. Such an approach reaps benefits of reducing the time to make a new prediction and also taking care of less past information. Thus, a transfer learning-based AI approach can also be beneficial in storing the less information at both the network entities, which is ultimately beneficial when there is less memory available to store the data. On the other hand, an AI-based predictor, when trained using the transfer learning, comes up with a benefit of early stopping criteria. This means that an excellent channel predictor function can be designed in a very less time.

In an embodiment, AI can also be used in estimating the channel before feeding back the update function. Therefore, an AI-based recursive estimator can also be designed which will be helpful in the reducing the error in the predicted and the estimated channel. Thus, the less the error between the predicted and estimated channel, the better would be the compression, which will come up with the advantage of providing more gain.

In an embodiment a neural network, in particular a recurrent neural network (RNN) can be used to implement the channel predictor. The gNB may implement the channel predictor to compute the predictor function, which will then be fed back to the UE. Even after the predictor function is determined, the RNN at the BS can keep running in the background, using the new estimated channel as an input. The RNN may keep updating the corresponding predictor function (or matrices) and may trigger an update in the prediction method, whenever a threshold is surpassed. This allow to track very well sudden changes of model (e.g., if the underlaying channel evolution changes, for example because a UE passed behind a building).

In an embodiment, the design of a new predictor and estimator using AI will not only reduce the channel MSE but also the OTA overhead. This will ultimately improve the performance of MIMO precoding. Hence, a cellular user can experience better quality-of-service (QoS) and higher data rate at a very low latency. Further, proposed solution can play a vital role in the industrial applications—factory automation, and vehicular communication, for example. These kinds of applications demand accurate CSI, which can be efficiently provided at a very low overhead cost.

In an embodiment, during the initialization phase, past channel realizations are stored and used to train the DNN. The DNN is used to predict next channels and the predictions is tested against the estimated value. Once the distance between the estimated value and the predicted value is below a certain threshold, the DNN is considered ready and is adopted as predictor.

Other possibilities involve a given number of pre-determined DNNs stored in the devices (and at the (e/g)NodeB), which may be enumerated in advance. During the set-up phase, a suitable DNN may be selected and adopted.

In an embodiment, a Kalman filter may be applied. In such case only one step prediction is necessary, that is $S_n^{BS}=S_n^{UE}=\hat{H}_{n-1}^{BS}$. Kalman filter realisation has a low computational complexity, and it is used below as a non-limiting example of a channel predictor function.

The (e/g)NodeB sends pilot symbols to the terminal device. The terminal device is configured to estimate the channel at time n using a Kalman filter. A Kalman filter is a Bayesian solution for estimating the state of a dynamic system, i.e., channel, in which, state evolution and measurement process are both linear. Broadly speaking, Kalman filter consists of two major steps, i.e., prediction and update. In prediction step, the state model is used to predict the state, at time instant n, by using the past (n−1) realizations. The update step updates the prediction, i.e., estimates the update, once the measurement becomes available. The update step may involve a number of operations, for instance, computing the Kalman gain. Finally, to predict the channel realization for time n+1, the equations obtained in the update step are put in the prediction stage. In an embodiment, a modified version of the Kalman filter is used. The input of the Kalman filter is $F_Q(\hat{H}_n)$, whereas in the classic Kalman filter the input is the estimated channel $\hat{H}_n$. The modified version enables the same Kalman filter run equivalently at both the (e/g)NodeB and the terminal device.

The terminal device predicts, utilising the Kalman filter, the channel at previous time instant, i.e., n−1, using the past realizations $S_n^{UE}=\{\hat{H}_k^{UE}\}_{n-N-1}^{n-1}$. Next, the terminal device obtains the difference between the predicted and estimated channel and then quantizes it $F_Q(\tilde{H}_n^{UE}-\hat{H}_n^{UE})$. This quantized version is then transmitted as a feedback to the (e/g)NodeB.

The (e/g)NodeB has also predicted the channel, $\tilde{H}_n^{BS}$, at time instant n−1 with the help of the Kalman filter using the past realizations $S_n^{BS}=\{\hat{H}_k^{BS}\}_{n-N-1}^{n-1}$. After receiving the feedback from the terminal device the (e/g)NodeB estimates the channel at time instant n by calculating the difference between the predicted channel and the quantized feedback version:

$$\hat{H}_n^{BS}=\tilde{H}_{n-1}^{BS}F_Q(\tilde{H}_{n-1}^{UE}-\hat{H}_n^{UE}).$$

In an embodiment, a RNN may be applied. The (e/g)NodeB uses the RNN to predict the multi-step ahead channel realization.

RNN is one of the techniques of ML to make the prediction of a data, which is correlated in time. The quantized version of the estimated channel, available at the (e/g)NodeB, is used to train and test the RNN. For the training purpose, a series of J consecutive blocks are passed as an input to the RNN and their corresponding labels to the output of the RNN. At time iteration n, RNN takes the quantized version of the channel as well as its d-step delayed versions, and output is predicted and the error between the predicted output and the actual label is backpropagated to update the weights (e.g., using adaptive moment estimation (Adam), etc.) of the RNN. This process is repeated until a certain convergence condition, e.g., accuracy of the predicted channel, etc., is met. Once the training is completed, RNN is used to make predictions.

Based on the predicted channel using RNN, a prediction function can be computed and fed back to the terminal device, where the terminal device makes the prediction with the help of reported information by the (e/g)NodeB. In this implementation, a single matrix $\hat{F}_1^{UE}$ is evaluated at the (e/g)NodeB. This is done using the following procedure.

1) Collect a set of predicted channels, and stack them into a matrix $$\tilde{P}=[\tilde{H}_L^{BS},\ldots,\tilde{H}_1^{BS}]$$

2) Collect the corresponding set of estimated channels:

$$\hat{P}=[\hat{H}_{L-1}^{BS},\ldots,\hat{H}_0^{BS}]$$

3) Since $\tilde{P}=F_1\hat{P}$ it results that:

$$\hat{F}_1=\tilde{P}\text{pinv}(\hat{P})$$

Where pinv(·) represents the right pseudo inverse. The matrix $\hat{F}_1$ is fed back at the UE, and will be used henceforth to predict the channel at both the (e/g)NodeB and the terminal device, using the following method:

$$\tilde{H}_n^{BS}=\hat{F}_1H_{n-1}^{BS}$$

$$\tilde{H}_n^{UE}=\hat{F}_1H_{n-1}^{BS}$$

In the second step, the (e/g)NodeB sends some pilot symbols to the terminal device, where the terminal device estimates the channel at time n using a dedicated channel estimator, e.g., it can be NN-based channel estimator or a KF-based channel estimator.

Once the (e/g)NodeB has transmitted the pilots, and the terminal device has estimated the channel $\hat{H}_n^{UE}$ the terminal device feeds back a "quantized" version of the difference between the predicted channel and the estimated one: $F_Q(\tilde{H}_n^{UE} - \hat{H}_n UE)$. This quantized version is feedback to the terminal device.

Similarly, at the (e/g)NodeB, the (e/g)NodeB has already predicted the channel, $\tilde{H}_n^{BS}$, at time instant n−1 with the help of the matrix $\hat{F}_1$. Therefore, the (e/g)NodeB estimates the channel at time instant n by calculating the difference between the predicted channel and the quantized feedback version. Mathematically, $$\hat{H}_{n-1}^{BS} = \tilde{H}_{n-1}^{BS} - F_Q(\tilde{H}_{n-1}^{UE} - \hat{H}_n^{UE}).$$

Examples of prediction functions fed back from the (e/g)NodeB to the terminal device include, without being limited to, full function reporting, function index, model-based representation, model-based representation index.

When the full function reporting is selected, the NN is converted to an equation. This is simply done by writing the input-output relationship, considering weights and activation functions. The methods to convert NNs into equations are known in the literature and reported here for completeness. This is, however, a discouraged method, as the function itself can be too complex to be implemented and feedback.

$$Y = g(WX + b)$$

where W and b represents the weights of a NN, X and Y depict the inputs (in terms of machine learning (ML), input features of a NN) and outputs of a NN. Also, g (·) represent the activation function, which can be rectified linear unit (ReLu), hyperbolic tangent (tanh), sigmoid, etc.

When the function index is selected, a certain number of functions is reported into a table, which will be set at standard level (preferred) or agreed upon during the assessment phase. The NN is converted into an equation, then the function in the set that is the closest (i.e., that gives the predictions that are the closest) to the NN is selected. Such solution has, however, the problem of finding an optimal set of functions.

A preferred function selection is model-based representation. A certain number of matrix-based models for channel evolution are evaluated through the NN, and the matrix composition is returned. For example, an auto regressive model of order K can be adopted:

$$\tilde{H}_n^{BS} = \Sigma_{k=m}^M \hat{F}_k^{UE} \hat{H}_{n-k}^{BS}$$

The output of the predictor block is to provide the set of matrices $\{\hat{F}_k^{UE}\}$.

When the model-based representation index is selected, a predictor matrices codebook is established through standards. The BS feeds back the matrices (or their combination) that better approximates the set of matrices $\{\hat{F}_k^{UE}\}$.

By using at the (e/g)NodeB a RNN the predictor function may be trained periodically or on demand, for example, when the environment or the user speeds change, improving thus the accuracy of the predictor.

Figure 6:
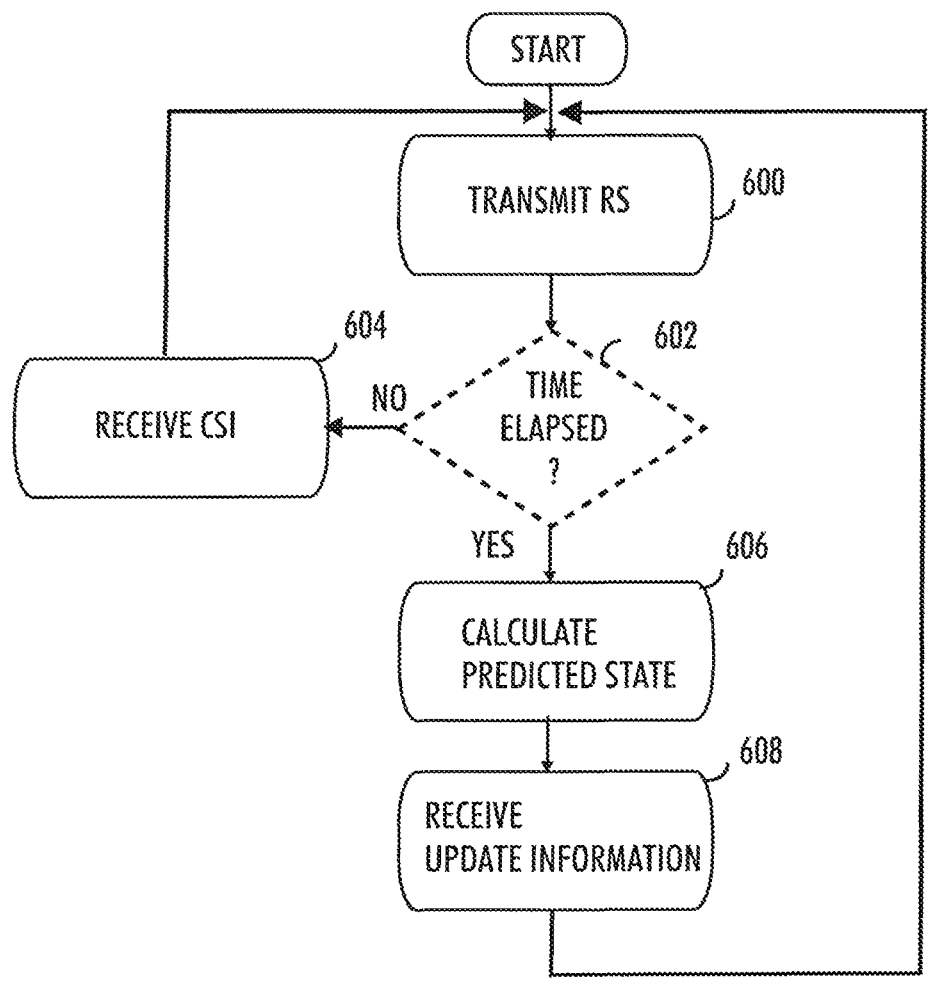
FIGS. 6 and 7 are flowcharts illustrating some embodiments.

The flowchart of FIG. 6 illustrates an embodiment. The flowchart illustrates an example of the operation of an apparatus. In an embodiment, the apparatus may be a network node or (e/g)NodeB, a part of a network node or (e/g)NodeB or any other apparatus capable of executing following steps.

The flowchart illustrates the operation of the apparatus in both initialisation 402 and prediction 404 phases.

In step 600, the apparatus is configured to transmit reference data to terminal device. The reference data may be pilot symbols, for example.

In step 602, the apparatus is configured to check whether the initialisation phase has elapsed. If not, the apparatus is configured to receive 604 and store information transmitted by the terminal device, the information describing state of the channel between the apparatus and the terminal device and then continue transmitting reference data.

If initialisation phase has elapsed, the above checking is no longer needed and the process may proceed from step 600 directly to step 606 where the apparatus is configured to calculate a predicted state of the channel utilising a given channel predictor function known by the terminal device. In an embodiment, the channel predictor function is a Kalman filter.

In step 608, the apparatus is configured to receive update information to the predicted state of the channel from the terminal device.

In an embodiment, the apparatus is configured to update the predicted state of the channel based on the update information received from the terminal device.

In an embodiment, the apparatus is configured to determine the predicted state of channel is correct if no updates are received from the terminal device.

In an embodiment, the apparatus is configured to utilise information on the predicted state of the channel when transmitting data to the terminal device.

Figure 7:
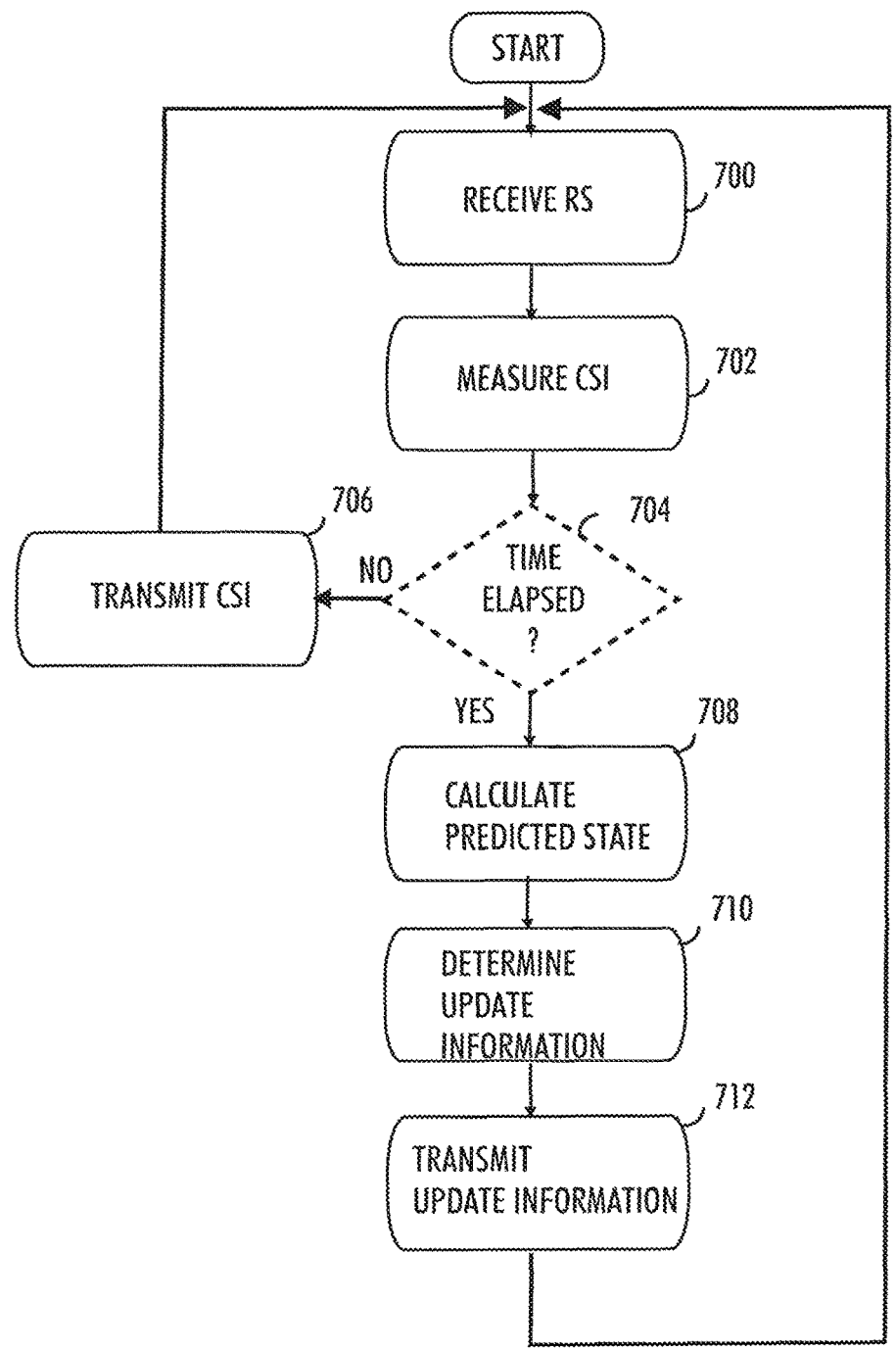

The flowchart of FIG. 7 illustrates an embodiment. The flowchart illustrates an example of the operation of an apparatus. In an embodiment, the apparatus may be a terminal device or user equipment, a part of a terminal device or user equipment or any other apparatus capable of executing following steps.

The flowchart illustrates the operation of the apparatus in both initialisation 402 and prediction 404 phases.

In step 700, the apparatus is configured to receive reference data from a network node such as (e/g)NodeB. The reference data may be pilot symbols, for example.

In step 702, the apparatus is configured to measure the state of the channel between the apparatus and the network node based on the reference data.

In step 404, the apparatus is configured to check whether the initialisation phase has elapsed. If not, the apparatus is configured to transmit 604 the measured state of the channel in a compressed for to the network element and then continue receiving reference data.

If initialisation phase has elapsed, the above checking is no longer needed and the process may proceed from step 702 directly to step 708 where the apparatus is configured to calculate a predicted state of the channel utilising a given channel predictor function known by the network node. In an embodiment, the channel predictor function is a Kalman filter.

In step 710, the apparatus is configured to determine difference between the predicted state of channel and the measured state of channel.

In step 712, the apparatus is configured to transmit information on the difference to the network node.

In an embodiment, if the difference between the predicted state of channel and the measured state of channel is smaller than a given threshold, the apparatus is configured to transmit information on the difference to the network node.

Figure 8:
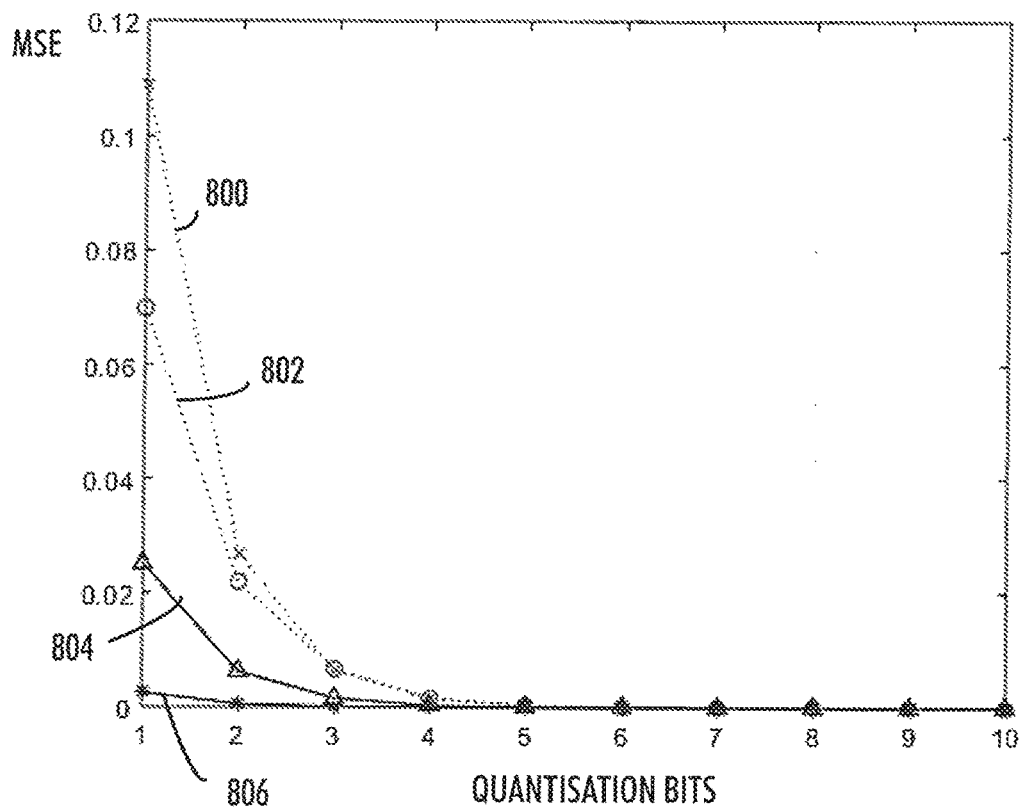
FIG. 8 illustrates an example of performance of conventional approach and the proposed solution.

FIG. 8 illustrates an example of the performance of the proposed solution. To assess the performance, two evaluation parameters, i.e., mean-squared-error (MSE) and received SNR, are calculated by using the actual channel, $H_n$, and the estimated channel, $\hat{H}_n^{BS}$, at the (e/g)NodeB.

The MSE may be calculated as follows:

$$MSE = \frac{1}{N}\sum_{n=1}^{N}\|H_n - \hat{H}_n^{BS}\|_{FRO}^2$$

where $\|\cdot\|_{FRO}$ indicates Frobenius norm.

The MSE measures the distance between the actual channel and the estimated one. A perfect estimator would have a MSE equal to 0. In order to assess the gains in terms of communication parameters, the estimated channel Pr is used to compute a simple matched filter precoder, and the received SNR is measured in a single user MIMO case.

FIG. 8 depicts the performance of MSE under the conventional approach and the proposed solution, when the quantization bits are increased from 1 to 10. Additionally, different curves are portrayed by considering different values of $\tau$, where $\tau$ is a parameter that measures the one step correlation between two consecutive channel realization. In other words, $\tau$ measures how much the channel is predictable, where $\tau=0$ indicates a channel that is perfectly predictable and $\tau=1$ indicates a channel for which each realization is independent from the previous.

In FIG. 8, a conventional CSI method with $\tau=0.5$ is denoted with 800, conventional CSI method with $\tau=0.1$ is denoted with 802. The proposed solution with $\tau=0.5$ is denoted with 804 and the proposed solution with $\tau=0.1$ is denoted with 806.

The figure shows that increasing the quantization bits leads to reduced MSE, in both the conventional approach and proposed solution. However, the proposed solution outperforms the conventional approach in with both values of $\tau$. For example, having one quantization bit with $\tau=0.1$, the proposed solution reduces provides the MSE up to 97%. In a similar manner, with $\tau=0.5$, the MSE is reduced by 77%.

It can be observed that increasing $\tau$ results in reducing less percentage of MSE, which is due to the reason of inaccurate prediction. However, the reduction with higher values of $\tau$ is still significant and the performance of conventional approach nears the proposed solution when the number of quantization bits is 4. On the other hand, the proposed solution gives the similar result with one quantization bit, therefore, with the proposed solution it is possible to save 3 quantization bits. Thus, the proposed solution can reduce the MSE at parity of overhead bit or can provide same level errors using fewer bits to represent the feedback.

Figure 9:
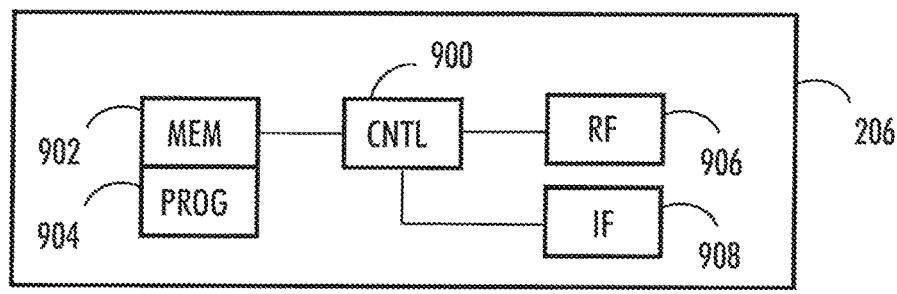
FIGS. 9, 10 and 11 illustrate simplified examples of apparatuses applying some embodiments of the invention.
Figure 10:
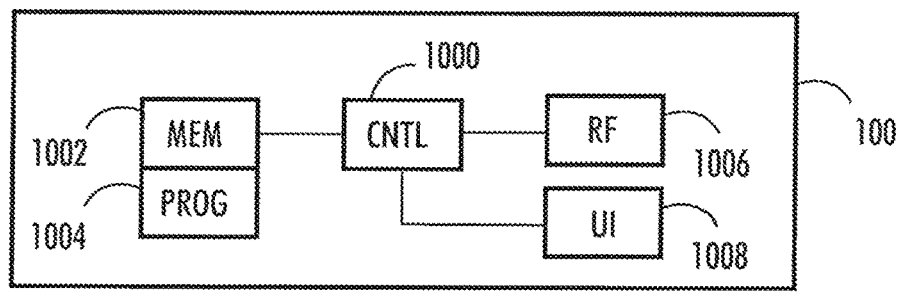

FIGS. 9 and 10 illustrate embodiments. The figures illustrate a simplified example of an apparatus applying embodiments of the invention. It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

FIG. 9 illustrates an example of an apparatus which may be a base station, (e/g)NodeB 206 or a part of base station or (e/g)NodeB.

The apparatus 206 of the example includes a control circuitry 900 configured to control at least part of the operation of the apparatus.

The apparatus may comprise a memory 902 for storing data. Furthermore, the memory may store software 904 executable by the control circuitry 000. The memory may be integrated in the control circuitry.

The apparatus may comprise one or more interface circuitries 906, 908. The interface circuitries are operationally connected to the control circuitry 900. An interface circuitry 906 may be a set of transceivers configured to communicate wirelessly with terminal devices or user equipment of a wireless communication network. The interface circuitry may be connected to an antenna arrangement (not shown). The apparatus may also comprise a connection to a transmitter instead of a transceiver. The apparatus may further comprise an interface 908 configured to communicate with other network elements such a core network or other corresponding apparatuses, for example a user interface.

In an embodiment, the software 904 may comprise a computer program comprising program code means adapted to cause the control circuitry 900 of the apparatus to realise at least some of the embodiments described above.

FIG. 10 illustrates an example of an apparatus which may be user equipment or terminal device 100 or a part of user equipment or a terminal device.

The apparatus 100 of the example includes a control circuitry 1000 configured to control at least part of the operation of the apparatus.

The apparatus may comprise a memory 1002 for storing data. Furthermore, the memory may store software 1004 executable by the control circuitry 1000. The memory may be integrated in the control circuitry.

The apparatus may comprise one or more interface circuitries 1006, 1008. The interface circuitries are operationally connected to the control circuitry 1000. An interface circuitry 1006 may be a set of transceivers configured to communicate with a RAN node such as an (e/g)NodeB of a wireless communication network. The interface circuitry may be connected to an antenna arrangement (not shown). The apparatus may also comprise a connection to a transmitter instead of a transceiver. The apparatus may further comprise a user interface 1008.

In an embodiment, the software 1004 may comprise a computer program comprising program code means adapted to cause the control circuitry 1000 of the apparatus to realise at least some of the embodiments described above.

Figure 11:
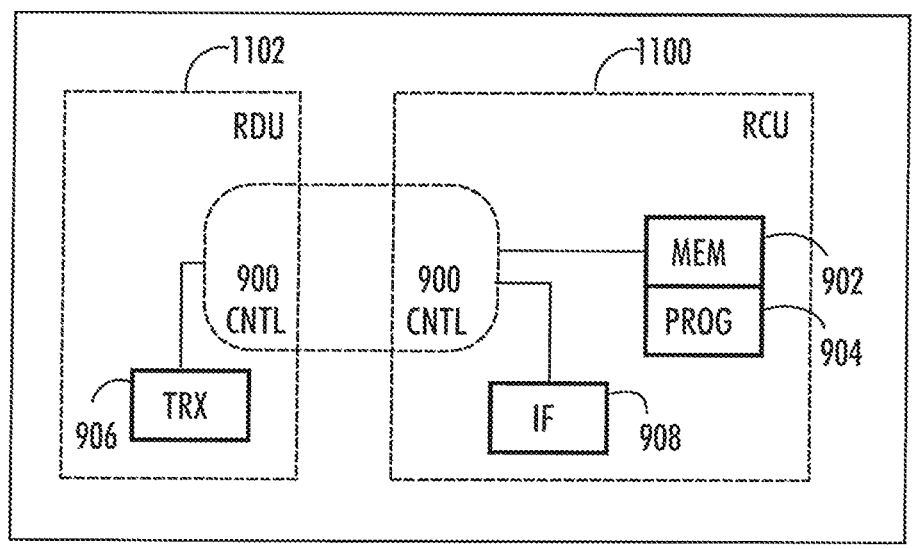

In an embodiment, as shown in FIG. 11, at least some of the functionalities of the apparatus of FIG. 9 may be shared between two physically separate devices, forming one operational entity. Therefore, the apparatus may be seen to depict the operational entity comprising one or more physically separate devices for executing at least some of the described processes. Thus, the apparatus of FIG. 11, utilizing such shared architecture, may comprise a remote control unit RCU 1100, such as a host computer or a server computer, operatively coupled (e.g. via a wireless or wired network) to a remote distributed unit RDU 1102 located in the (e/g)NodeB. In an embodiment, at least some of the described processes may be performed by the RCU 1100. In an embodiment, the execution of at least some of the described processes may be shared among the RDU 1102 and the RCU 1100.

In an embodiment, the RCU 1100 may generate a virtual network through which the RCU 1100 communicates with the RDU 1102. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus in a communication system comprising means for transmitting reference data to terminal device; receiving, for a given time period, from the terminal device information describing state of the channel between the apparatus and the terminal device; calculating a predicted state of the channel utilising a given channel predictor function known by the terminal device; receiving update information to the predicted state of the channel from the terminal device.

In an embodiment, an apparatus in a communication system comprising means for receiving reference data from a network node; measuring the state of the channel between the apparatus and the network node based on the reference data; transmitting, for a given time period, channel state information to the network node; calculating a predicted state of the channel utilising a given algorithm known by the network node; determining difference between the predicted state of channel and the measured state of channel; transmitting information on the difference to the network node.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, comprising:
a processor; and
a memory including instructions, the instructions, when executed by the processor, cause the apparatus to:
receive from a terminal device capabilities of the terminal device;
determine the channel predictor function to be used at least partly based on the capabilities of the terminal device;
determine length of a given time period;
transmit reference data to terminal device;
receive, for a given time period, from the terminal device information describing state of the channel between the apparatus and the terminal device;
calculate, after the given time period as elapsed, a predicted state of the channel utilizing a given channel predictor function known by the terminal device; and
receive update information to the predicted state of the channel from the terminal device, the memory and the computer program code being configured to, with the processor, cause the apparatus further to:
calculate the predicted state of channel utilizing a Kalman filter comprising a quantization function of a computed update of a distance between two matrices.

2. The apparatus of claim 1, the memory and the computer program code being configured to, with the processor, cause the apparatus further to:
determine the predicted state of channel is correct if no updates are received from the terminal device.

3. The apparatus of claim 1, the memory and the computer program code being configured to, with the processor, cause the apparatus further to:
update the predicted state of the channel based on the update information received from the terminal device.

4. The apparatus of claim 1, the memory and the computer program code being configured to, with the processor, cause the apparatus further to:
utilize information on the predicted state of the channel when transmitting data to the terminal device.

5. An apparatus in a communication system, comprising:
a processor; and
a memory including instructions, the instructions, when executed by the processor, cause the apparatus to:
transmit information on capabilities of the apparatus to a network node;
receive from the network node information on the channel predictor function to be used;
receive from the network node information on the given time period;
receive reference data from a network node;
measure the state of the channel between the apparatus and the network node based on the reference data;
transmit, for a given time period, channel state information to the network node;
calculate, after the given time period as elapsed, a predicted state of the channel utilizing a given channel predictor function known by the network node;
determine difference between the predicted state of channel and the measured state of channel; and
transmit information on the difference to the network node, the memory and the computer program code being configured to, with the processor, cause the apparatus further to:
calculate the predicted state of channel utilizing a Kalman filter comprising a quantization function of a computed update of a distance between two matrices.

6. The apparatus of claim 5, the memory and the computer program code being configured to, with the processor, cause the apparatus further to:
if the difference between the predicted state of channel and the measured state of channel is smaller than a given threshold, cease transmitting information on the difference to the network node.

7. A method in an apparatus in a communication system, said method comprising:
receiving from the terminal device capabilities of the terminal device;
determining the channel predictor function to be used at least partly based on the capabilities of the terminal device;
determining length of a given time period;
transmitting reference data to terminal device;
receiving, for a given time period, from the terminal device information describing state of the channel between the apparatus and the terminal device;
calculating, after the given time period as elapsed, a predicted state of the channel utilizing a given channel predictor function known by the terminal device; and
receiving update information to the predicted state of the channel from the terminal device, further comprising:
calculating the predicted state of channel utilizing a Kalman filter comprising a quantization function of a computed update of a distance between two matrices.

8. The method of claim 7, further comprising:
determining the predicted state of channel is correct if no updates are received from the terminal device.

9. The method of claim 7, further comprising:
updating the predicted state of the channel based on the update information received from the terminal device.

10. The method of claim 7, further comprising:
utilizing information on the predicted state of the channel when transmitting data to the terminal device.

* * * * *